United States Patent
Chen et al.

(10) Patent No.: US 8,240,789 B2
(45) Date of Patent: Aug. 14, 2012

(54) POSITIONING DEVICE FOR SLIDE ASSEMBLY

(75) Inventors: Ken-Ching Chen, Kaohsiung Hsien (TW); Shih-Lung Huang, Kaohsiung Hsien (TW); Chun-Chiang Wang, Kaohsiung Hsien (TW)

(73) Assignee: King Slide Works Co., Ltd., Kaohsiung Hsien (TW)

(*) Notice: Subject to any disclaimer, the term of this patent is extended or adjusted under 35 U.S.C. 154(b) by 168 days.

(21) Appl. No.: 12/778,351

(22) Filed: May 12, 2010

(65) Prior Publication Data

US 2011/0280506 A1    Nov. 17, 2011

(51) Int. Cl.
A47B 88/00 (2006.01)
A47B 95/00 (2006.01)

(52) U.S. Cl. .................... 312/334.7; 312/333

(58) Field of Classification Search .......... 312/333, 312/334.7, 334.8, 334.1, 334.44, 334.47; 384/21, 10

See application file for complete search history.

(56) References Cited

U.S. PATENT DOCUMENTS

| | | | |
|---|---|---|---|
| 6,457,790 B1* | 10/2002 | Liang et al. | 312/334.46 |
| 6,585,335 B2 | 7/2003 | Hwang et al. | |
| 6,899,408 B2 | 5/2005 | Chen et al. | |
| 6,997,611 B2* | 2/2006 | Chen et al. | 384/21 |
| 7,118,277 B2* | 10/2006 | Chen et al. | 384/21 |
| 7,240,977 B2 | 7/2007 | He | |
| 7,357,468 B2* | 4/2008 | Hwang et al. | 312/333 |
| 7,520,577 B2 | 4/2009 | Chen et al. | |
| 7,611,213 B2 | 11/2009 | Wu et al. | |
| 7,654,624 B2 | 2/2010 | Huang et al. | |
| 7,677,679 B2 | 3/2010 | Hsiung et al. | |
| 2005/0180667 A1* | 8/2005 | Chen et al. | 384/21 |
| 2006/0288529 A1* | 12/2006 | Chen et al. | 16/96 R |
| 2007/0164644 A1* | 7/2007 | Hwang et al. | 312/333 |
| 2007/0170829 A1* | 7/2007 | Chen et al. | 312/334.1 |
| 2007/0296318 A1* | 12/2007 | Peng et al. | 312/334.44 |
| 2008/0078899 A1* | 4/2008 | Chen et al. | 248/220.21 |
| 2008/0226208 A1* | 9/2008 | Duan et al. | 384/35 |
| 2009/0169140 A1* | 7/2009 | Chen et al. | 384/21 |
| 2011/0135224 A1* | 6/2011 | Chen et al. | 384/26 |

* cited by examiner

Primary Examiner — David Dunn
Assistant Examiner — Ryan A Doyle
(74) Attorney, Agent, or Firm — Rosenberg, Klein & Lee

(57) ABSTRACT

A positioning device of a slide assembly includes a first rail, a second rail slidably connected to the first rail and defining a path, and a third rail slidably connected to the path of the second rail. A positioning member is securely connected to the second rail. An engaging member is pivotably connected to the positioning member and includes an extension arm located corresponding to the positioning portion of the first rail and capable of engaging with the positioning portion. An extension wing has an inclined surface relative to a horizontal plane and extending toward the path of the second rail. A resilient member is connected to the engaging member and makes the extension wing of the engaging member slide toward the third rail. When the third rail is retracted relative to the second rail, the engaging member is disengaged from the positioning portion of the first rail.

8 Claims, 6 Drawing Sheets

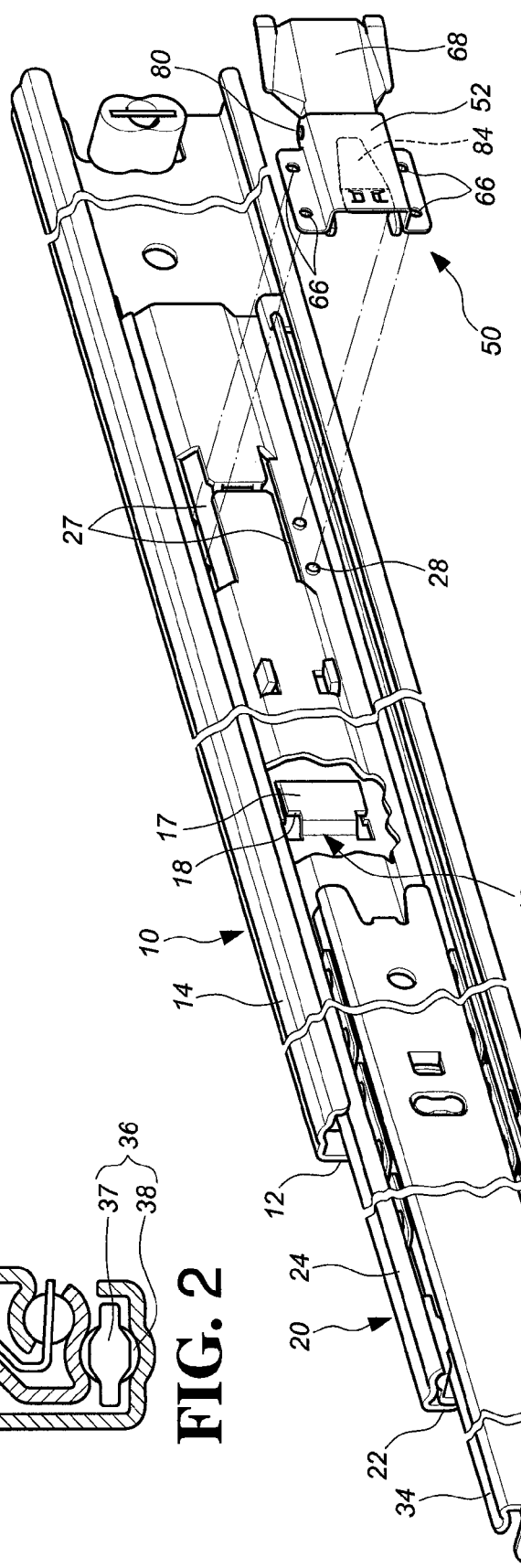
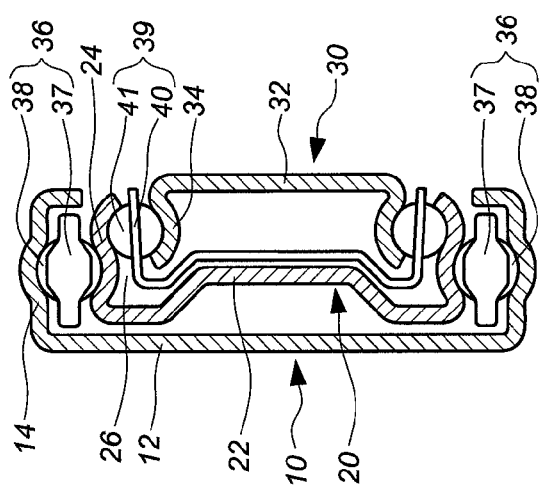
FIG. 1
FIG. 2

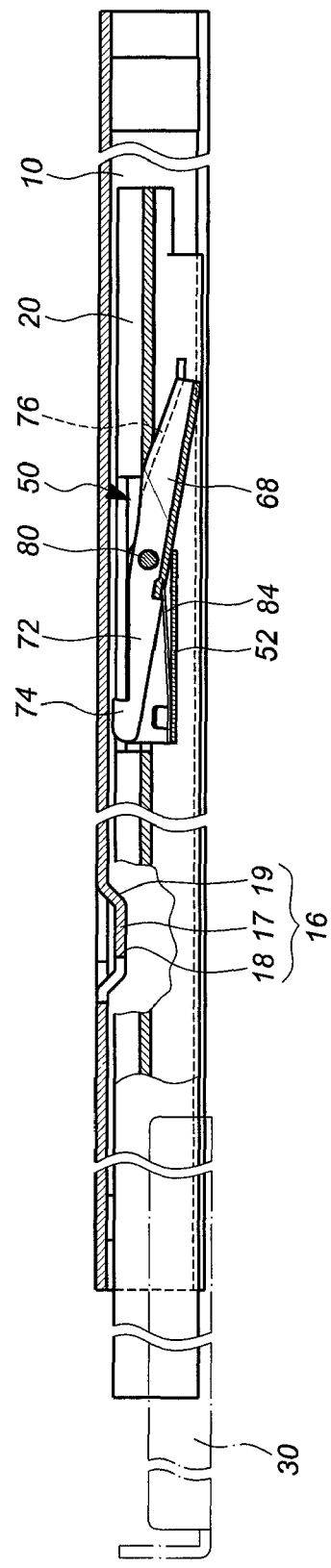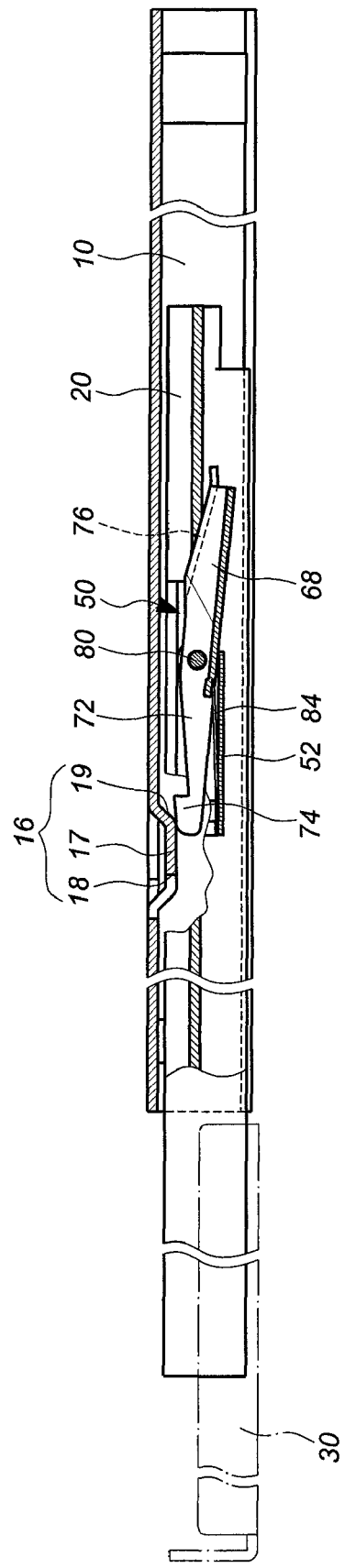

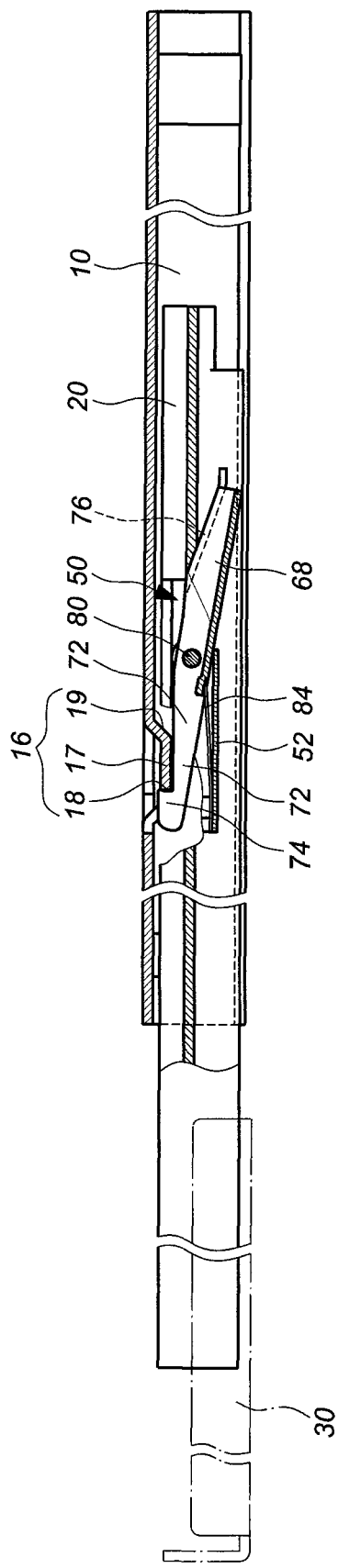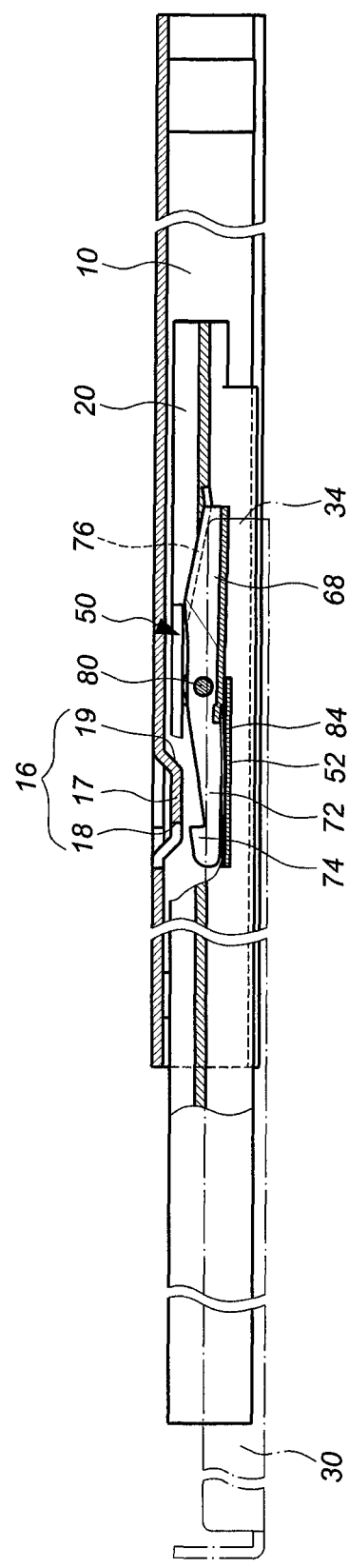

POSITIONING DEVICE FOR SLIDE ASSEMBLY

FIELD OF THE INVENTION

The present invention relates to a positioning device, and more particularly, to a positioning device used on three-rail slide assembly.

BACKGROUND OF THE INVENTION

Slide assemblies are widely used on different applications including office furniture, kitchen furniture and rack of server. The conventional slide assemblies often seen include two rails and three rails which are retractably cooperated with drawers. In some conditions of use, the users want to position the slide parts to be positioned at open status when they are pulled out and the positioning device for the slide parts are then developed. Taken the three-rail slide assembly as an example, it generally includes two positioning members to position the first and second rails, and the second and third rails. A manual release member is used to release the positioning device for the second and third rails, and the positioning status between the first and second rails is automatically released by retracting the third rail.

For the positioning device, especially for the third rail automatically releasing the positioning status between the first and second rails, the applicant has been filed many patent applications such as U.S. Pat. Nos. 6,585,335, 6,899,408, 6,997,611, 7,118,277, and 7,520,577. These are for reference in this case.

SUMMARY OF THE INVENTION

The present invention intends to provide a positioning device for slide assembly and which provides the slide parts to be positioned when they are pulled out, and a member is located on the rail to automatically release the positioning status to have a safe operation.

The present invention relates to a positioning device of a slide assembly, and the slide assembly comprises a first rail, a second rail slidably connected to the first rail and defining a path, and a third rail slidably connected to the path of the second rail. The third rail comprises a main part and a sidewall extends from one of two sides of the main part. The positioning device comprises a positioning member securely connected to the second rail. An engaging member is pivotably connected to the positioning member and comprises an engaging board and an extension arm extends from a side of the engaging board. The extension arm has an engaging portion at an end thereof, an extension wing extending from a side of the engaging board and a pivotal portion located between the extension arm and the extension wing. The extension wing has an inclined surface relative to a horizontal plane and extends toward the path of the second rail. A resilient member is connected between the positioning member and the engaging member. The extension wing of the engaging member slides toward the third rail by a force of the resilient member. The first rail comprises a positioning portion which is located corresponding to the engaging portion of the engaging member. When the second rail is pulled out a position relative to the first rail, the engaging portion of the engaging member is engaged with the positioning portion of the first rail. When the third rail is retracted to a position relative to the second rail, the sidewall of the third rail movably presses the extension wing of the engaging member to move the engaging member, and the resilient member is pressed to release the engaging portion of the engaging member from the positioning portion of the first rail.

The positioning portion of the first rail is a hook-shaped portion which is engaged with the stop end.

The positioning member comprises a board portion and two extension portions which extend from two sides of the board portion. Two positioning portions respectively extend from a part of the extension portion. The board portion and the two extension portions define a space, so that the extension wings of the engaging member are located in the space of the positioning member.

The resilient member comprises a connection portion and a resilient portion which extends from the connection portion. The connection portion is fixed to the board portion of the positioning member. The resilient portion compresses the engaging member which provides a resilient force applied on the positioning member.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 1 is an exploded view to show the positioning device and the slide assembly of the present invention;

FIG. 2 is an end cross sectional view of the slide assembly of the present invention;

FIG. 6 shows that the parts of the slide assembly are pulled out and not yet positioned;

FIG. 7 shows another status wherein the parts of the slide assembly are pulled out and not yet positioned;

FIG. 8 shows that the parts of the slide assembly are pulled out and are positioned;

FIG. 9 shows that the parts of the slide assembly are retracted, and

DETAILED DESCRIPTION OF THE PREFERRED EMBODIMENT

Figure 3:
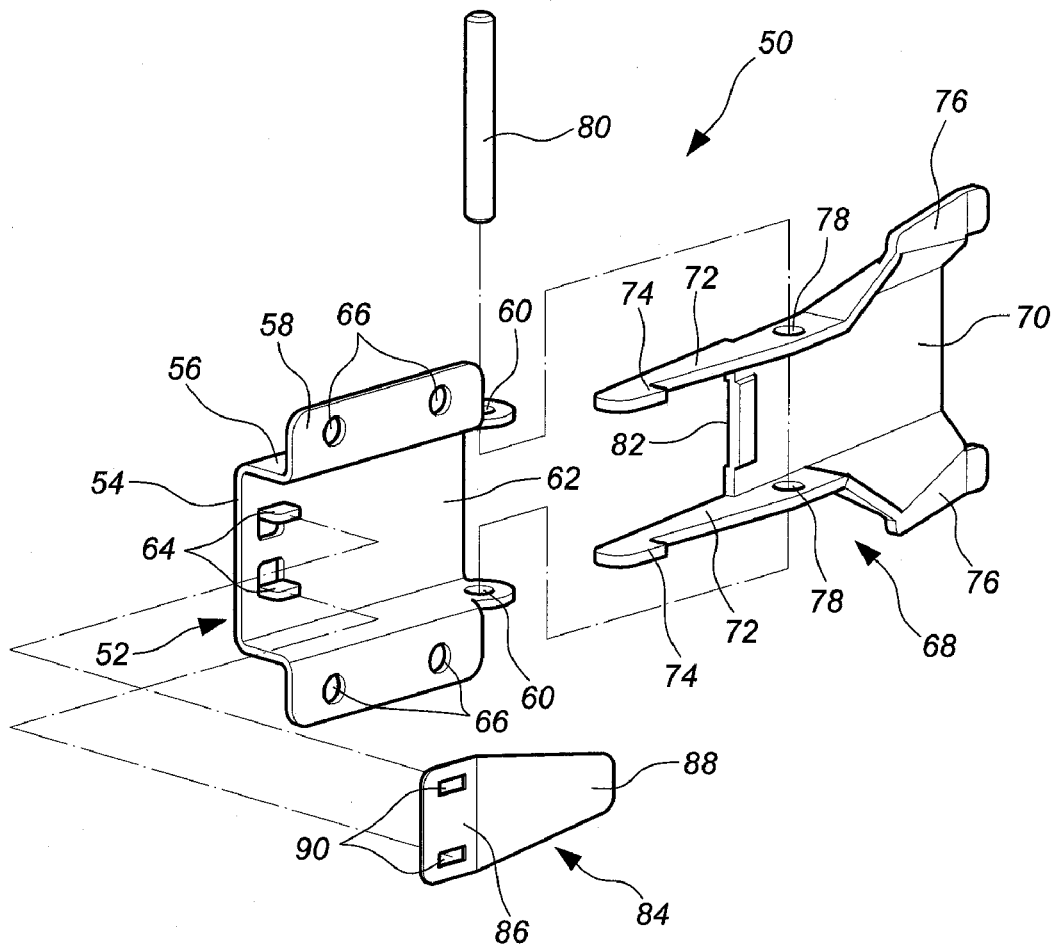
FIG. 3 is an exploded view of the positioning device of the present invention.

Referring to FIGS. 1 and 2, the slide assembly of the present invention comprises a first rail 10 which has a pre-set length and comprises a slim elongate main part 12, and two sidewalls 14 extend from two opposite sides of the main part 12. The main part 12 preferably includes a positioning portion 16. Preferably, the positioning portion 16 of the first rail 10 comprises a guide wall 17 and a stop end 18 which is located beside a first end of the guide wall 17. A second end of the guide wall 17 includes an inclined surface 19 as shown in FIG. 6.

A second rail 20 is slidably connected to the first rail 10 and has a pre-set length. The second rail 20 includes a slim and elongate main part 22 and two sidewalls 24 extending from two opposite sides of the main part 22. The main part 22 and the two sidewalls 24 define a path 26. Preferably, the main part 22 of the second rail 20 has one or two holes 27.

A third rail 30 is slidably connected to the path 26 of the second rail 20. The third rail 30 comprises a main part 32 and two sidewalls 34 extend from two opposite sides of the main part 32, or one sidewall 34 extends from one of the two sides of the main part 32.

Preferably, a first assistance member 36 is connected between the first and second rails 10, 20, so that the first and second rails 10, 20 are easily to move relative to each other. In another embodiment, the first assistance member 36 includes a first maintaining member 37 and a plurality of balls 38 are movably connected to the first maintaining member 37 in pair.

As mentioned before, a second assistance member 39 is connected between the second and third rails 20, 30, so that the second and third rails 20, 30 are easily to move relative to each other. In another embodiment, the second assistance member 39 includes a second maintaining member 40 and a plurality of balls 41 are movably connected to the second maintaining member 40 in pair.

Figure 4:
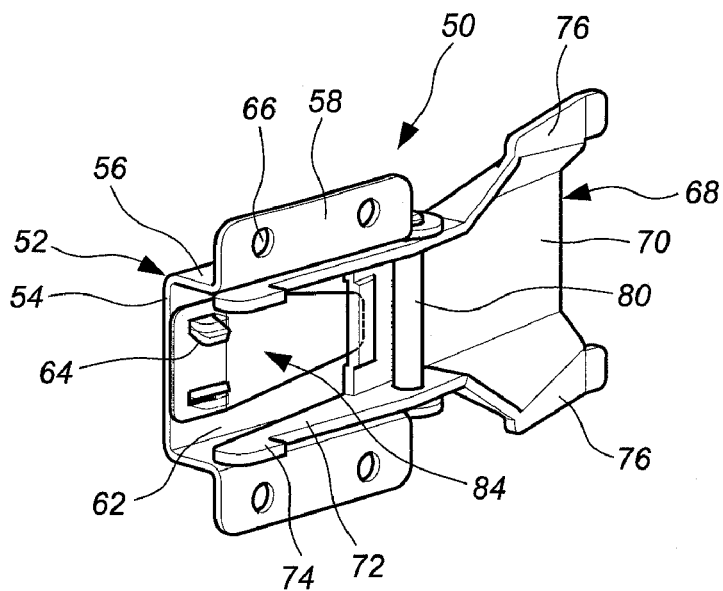
FIG. 4 is a perspective view to show the positioning device of the present invention.
Figure 5:
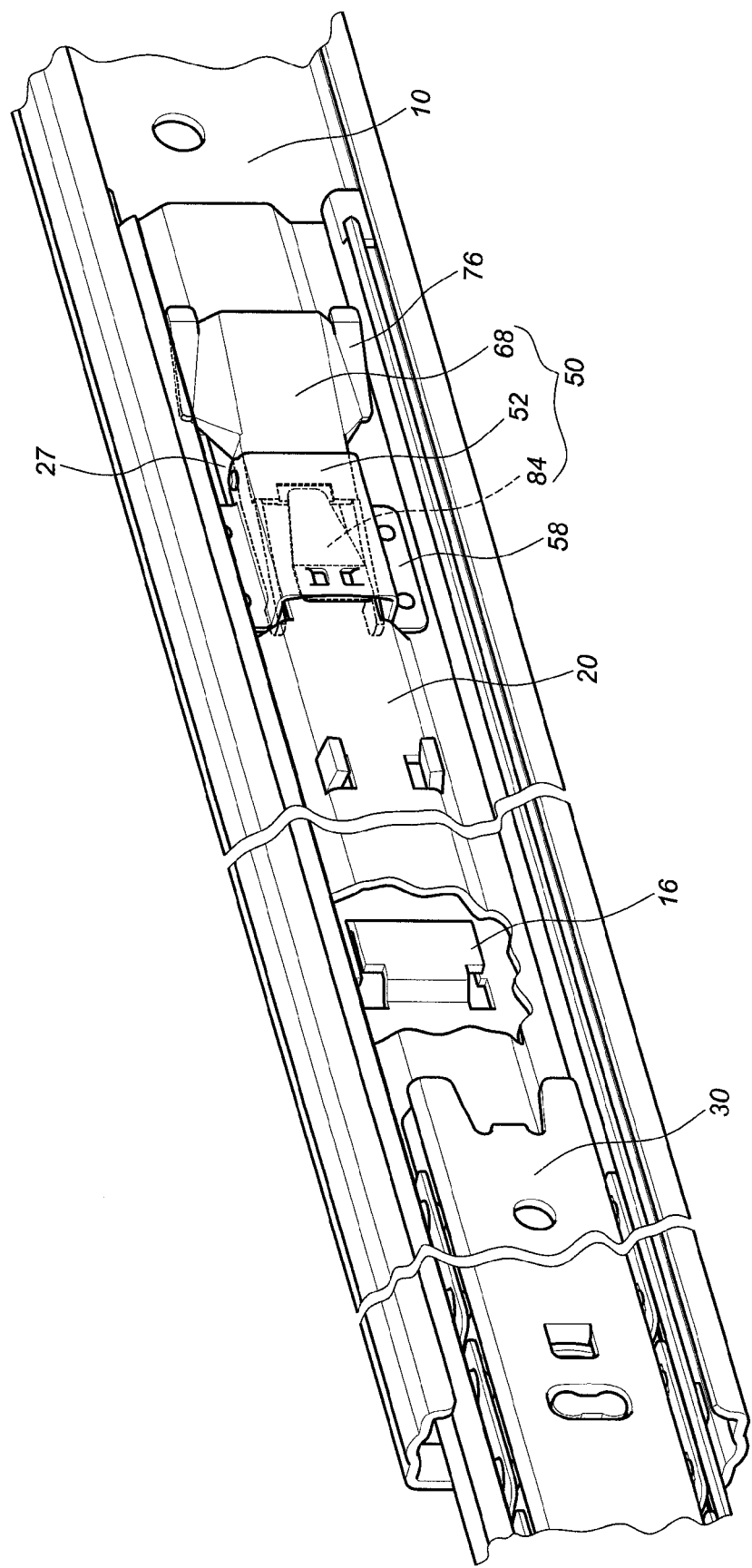
FIG. 5 is a perspective view to show the positioning device of the present invention installed to the slide assembly.

A positioning device 50 as shown in FIGS. 3 to 5, comprises a positioning member 52 securely connected to the second rail 20 and located corresponding to the hole 27 in the second rail 20. The positioning member 52 comprises a board portion 54 and two extension portions 56 which extend from two sides of the board portion 54. Two positioning portions 58 respectively extend a part of the extension portions 56. The two rest parts of the two extension portions 56 respectively include a first pivotal portion 60. The board portion 54 and the two extension portions 56 defining a space 62. The board portion 54 includes two projections 64 extending toward the space 62. The positioning portions 58 further include a plurality of installation holes 66. In one preferable embodiment, as shown in FIG. 1, the second rail 20 further comprise a plurality of protrusions 28 which are located corresponding to the installation holes 66 of the positioning member 52 so that the positioning member 52 is fixed to the second rail 20 by pressing or other proper methods. Preferably, the first pivotal portion 60 is a pivotal hole.

An engaging member 68 is pivotably connected to the positioning member 52 and comprises an engaging board 70 and two extension arms 72 extending from two opposite sides of the engaging board 70. Each extension arm 72 includes an engaging portion 74 at an end thereof and located corresponding to the stop end 18 of the first rail 10, the engaging portion 74 can be engaged with the stop end 18. The extension arms 72 are located in the space 62 of the positioning member 52. Two extension wings 76 extend from two opposite sides of the engaging board 70 and two second pivotal portions 78 are located between the extension arms 72 and the extension wings 76. The engaging portion 74 is a hook-shaped member and the second pivotal portion 78 is a pivotal hole. In one preferable embodiment, the engaging member 68 is pivotably connected to the first pivotal portion 60 of the positioning member 52 and the second pivotal portion 78 of the engaging member 68 by a pivot member 80. Besides, the extension arms 72 extend through the holes 27 of the second rail 20. The extension wing 76 has an inclined surface relative to a horizontal plane and extends toward the path 26 of the second rail 20. The engaging board 70 includes a recess 82.

A resilient member 84 is fixedly connected between the positioning member 52 and the engaging member 68. The resilient member 84 includes a connection portion 86 and a resilient portion 88 extending from the connection portion 86, wherein the connection portion 86 includes two openings 90 with which the projections 64 of the positioning member 52 are securely engaged. The resilient portion 88 presses the recess 82 of the engaging member 68 which provides a resilient force applied on the positioning member 52. In other words, by the resilient force of the resilient member 84, the extension wings 76 of the engaging member 68 are maintained to be oriented toward the third rail 30.

When a force is applied to the extension wings 76, the engaging member 68 is pivoted about the second pivotal portion 78 to lift the engaging portion 74 and compress the resilient member 84. When there is no such a force applied to the extension wings 76, the force of the resilient member 84 is released so that the engaging member 68 is maintained an initial status relative to the positioning member 52.

As shown in FIG. 6 which shows that the parts of the slide assembly are pulled, wherein the second rail 20 is pulled out relative to the first rail 10, the engaging member 68 of the positioning device 50 moved with the movement of the second rail 20. When the second rail 20 is pulled out a position relative to the first rail 10, the engaging portion 74 of the engaging member 68 is engaged with the inclined surface 19 of the positioning portion 16 of the first rail 10 and moves. The engaging member 68 shifts an angle by the push of the inclined surface 19 as shown in FIG. 7. When the second rail 20 is continuously pulled out relative to the first rail 10, the engaging portion 74 of the engaging member 68 is positioned and hooked to the stop end 18 of the first rail 10 as shown in FIG. 8. In the meanwhile, the third rail 30 can be pulled out relative to the second rail 20, or pulled to a complete extension status. But the first and second rails 10, 20 are engaged with each other by the engagement between the engaging portion 74 of the engaging member 68 and the stop end 18 of the first rail 10.

Figure 10:
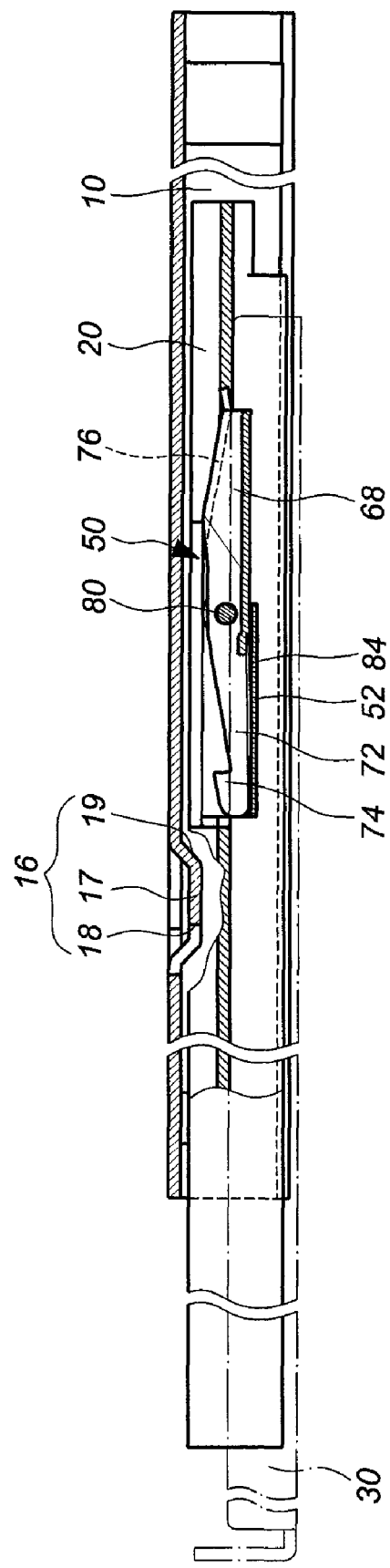
FIG. 10 shows another status of the slide assembly that is retracted.

As shown in FIG. 9 which shows that the parts of the slide assembly are retracted, wherein when the third rail 30 is retracted to a position relative to the second rail 20, the extension wings 76 of the engaging member 68 are maintained to be oriented toward the third rail 30, so that the sidewall 34 of the third rail 30 movably presses the extension wing 76 of the engaging member 68 so that the engaging member 68 is pivoted about the pivot member 80 and the resilient member 84 is pressed to release the engaging portion 74 of the engaging member 68 from the stop end 18 of the first rail 10. In the meanwhile, the second rail 20 is freely slidable and retractable toward the first rail 10 as shown in FIG. 10. Therefore, by the relative movement of the third rail 30 and the second rail 20, the engagement between the first and second rails 10, 20 can be automatically released, and the first, second and third rails 10, 20, 30 can be retracted in sequence.

While we have shown and described the embodiment in accordance with the present invention, it should be clear to those skilled in the art that further embodiments may be made without departing from the scope of the present invention.

What is claimed is:

1. A positioning device of a slide assembly, the slide assembly comprising:
   a first rail, a second rail slidably connected to the first rail and defining a path, and a third rail slidably connected to the path of the second rail, the third rail comprises a main part and a sidewall extending from one of two sides of the main part;
   the positioning device comprising:
   a positioning member securely connected to the second rail, the positioning member comprising a board portion and two extension portions which extend from two sides of the board portion, the board portion and the two extension portions defining a space;
   an engaging member pivotably connected to the positioning member and comprising an engaging board and an extension arm extending from a side of the engaging board, the extension arm located in the space of the positioning member and having an engaging portion at an end thereof, an extension wing extending from a side of the engaging board and a pivotal portion located between the extension arm and the extension wing, the extension wing having an inclined surface relative to a horizontal plane and extending toward the path of the second rail;

a resilient member releasably coupled to a front end of said positioning member, the resilient member disposed between the positioning member and the engaging member, the extension wing of the engaging member being slidable toward the third rail by a force of the resilient member;

the first rail comprising a positioning portion which is located corresponding to the engaging portion of the engaging member, and when the second rail is pulled out a position relative to the first rail, the engaging portion of the engaging member is engaged with the positioning portion of the first rail, when the third rail is retracted to a position relative to the second rail, the sidewall of the third rail movably presses the extension wing of the engaging member to move the engaging member and the resilient member is pressed to release the engaging portion of the engaging member from the positioning portion of the first rail.

2. The device as claimed in claim 1, wherein the positioning portion of the first rail comprises a guide wall and a stop end which is located beside a first end of the guide wall, a second end of the guide wall includes an inclined surface, the engaging portion of the engaging member is a hook-shaped portion which is engaged with the stop end.

3. The device as claimed in claim 1, wherein the positioning member comprises two positioning portions respectively extending from a part of the extension portion and are securely connected to the second rail such that the extension arm of the engaging member is located in the space of the positioning member.

4. The device as claimed in claim 1, wherein the resilient member comprises a connection portion and a resilient portion which extends from the connection portion, the connection portion is fixed to the board portion of the positioning member, the resilient portion compresses the engaging member which provides a resilient force applied on the positioning member.

5. A slide assembly comprising:
a first rail;
a second rail slidably connected to the first rail and comprising a main part which includes a hole and two sidewalls which extend from two sides of the second rail, the two sidewalls and the main part defining a path;

a third rail slidably connected to the path of the second rail and comprising a main part and a sidewall extending from one of two sides of the main part;

a positioning member securely connected to the second rail and located corresponding to the hole, the positioning member comprising a board portion and two extension portions which extend from two sides of the board portion, the board portion and the two extension portions defining a space;

an engaging member pivotably connected to the positioning member and comprising an engaging board and an extension arm extending from a side of the engaging board, the extension arm having an engaging portion at an end thereof, an extension wing extending from a side of the engaging board and a pivotal portion located between the extension arm and the extension wing, the extension arm extending through the hole of the second rail and the extension wing having an inclined surface relative to a horizontal plane and extending toward the path of the second rail;

a resilient member releasably coupled to a front end of said positioning member, the resilient member disposed between the positioning member and the engaging member, the extension wing of the engaging member being slidable toward the third rail by a force of the resilient member;

the first rail comprising a positioning portion which is located corresponding to the engaging portion of the engaging member, and the sidewall of the third rail located corresponding to the extension wing of the engaging member and movably pressing the extension wing of the engaging member.

6. The assembly as claimed in claim 5, wherein the positioning portion of the first rail is a stop end and the engaging portion of the engaging member is a hook-shaped portion which is engaged with the stop end.

7. The assembly as claimed in claim 5, wherein the positioning member comprises two positioning portions respectively extending from a part of the extension portion and are securely connected to the second rail such that the extension arm of the engaging member is located in the space of the positioning member.

8. The assembly as claimed in claim 5, wherein the resilient member comprises a connection portion and a resilient portion which extends from the connection portion, the connection portion is fixed to the board portion of the positioning member, the resilient portion compresses the engaging member which provides a resilient force applied on the positioning member.

* * * * *